(12) United States Patent
Ozaki

(10) Patent No.: US 9,925,576 B2
(45) Date of Patent: Mar. 27, 2018

(54) SHAVING TOOL

(71) Applicant: Kabushiki Kaisha Kobe Seiko Sho (Kobe Steel, Ltd.), Hyogo (JP)

(72) Inventor: Katsuhiko Ozaki, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 14/888,111

(22) PCT Filed: Mar. 27, 2014

(86) PCT No.: PCT/JP2014/059036
§ 371 (c)(1),
(2) Date: Oct. 30, 2015

(87) PCT Pub. No.: WO2014/181607
PCT Pub. Date: Nov. 13, 2014

(65) Prior Publication Data
US 2016/0059290 A1    Mar. 3, 2016

(30) Foreign Application Priority Data
May 8, 2013  (JP) ................................. 2013-098473

(51) Int. Cl.
*B21C 43/04*   (2006.01)
*B23D 79/12*   (2006.01)
*B21F 99/00*   (2009.01)
*B21C 43/02*   (2006.01)

(52) U.S. Cl.
CPC ............. *B21C 43/04* (2013.01); *B21F 99/00* (2013.01); *B23D 79/12* (2013.01); *B21C 43/02* (2013.01)

(58) Field of Classification Search
CPC ......... B21C 43/04; B21C 43/02; B21F 99/00; B23D 79/12

USPC .......................................................... 409/310
See application file for complete search history.

(56) References Cited

U.S. PATENT DOCUMENTS

| 2,233,928 A |   | 3/1941 | Weaver |
|---|---|---|---|
| 2,896,310 A | * | 7/1959 | Young .................... B21C 43/02 407/14 |
| 4,076,441 A |   | 2/1978 | Byrnes |
| 5,099,723 A |   | 3/1992 | Ziemek |

FOREIGN PATENT DOCUMENTS

| JP | S51-69989 U | 6/1976 |
|---|---|---|
| JP | S53-001383 A | 1/1978 |
| JP | S59-073014 U | 5/1984 |
| JP | H04-226829 A | 8/1992 |
| JP | H05-228729 | 9/1993 |
| JP | 2007-283432 A | 11/2007 |

OTHER PUBLICATIONS

International Search Report and Written Opinion from PCT/JP2014/059036 dated Apr. 22, 2014.

* cited by examiner

*Primary Examiner* — Alan Snyder
(74) *Attorney, Agent, or Firm* — Studebaker & Brackett PC

(57) ABSTRACT

A shaving die for cutting the surface layer of a wire is provided with a circular cutting blade and a plurality of protrusions. The wire is inserted into the circular cutting blade so that the surface layer of the wire is cut. The protrusions are provided at positions around the cutting blade so as to come into contact with the surface layer of the wire that has been cut by the cutting blade.

5 Claims, 2 Drawing Sheets

SHAVING TOOL

TECHNICAL FIELD

The present invention relates to a shaving tool which cuts a surface of a steel wire.

BACKGROUND ART

Flaws, such as a scale and a roll mark, may remain on a surface of a steel wire (hereinafter simply referred to as wire) after a hot rolling step is completed. Due to these flaws, a number of irregularities often exist on the surface of the wire.

In this regard, in a step of manufacturing the wire, in order to smoothen the surface irregularities and improve quality of the surface of the wire, shaving in which a surface layer over the entirety of a circumference of the wire is cut and removed by a shaving tool is performed. This shaving is a step of finishing the wire, which is also referred to as peeling, and the wire is made to pass through a die including a cutting blade for cutting so that the surface of the wire is shaved. By this shaving, surface marks on the wire are removed and a metallic luster of the wire increases.

Such a technique of the shaving has been variously developed as disclosed in Patent Document 1 and Patent Document 2.

In a shaving method of a wire disclosed in Patent Document 1, shaving is performed while a cooling liquid is jetted to a blade edge of a die from a plurality of jetting devices, in each of which a direction of a nozzle is adjustable, fixed at corresponding positions different from each other.

Moreover, a shaving die disclosed in Patent Document 2 is made of powdered high-speed tool steel containing, in weight percent, C: 1.8-2.3%, Si: 1.0% or less, Mn: 1.0% or less, Cr: 3-6%, W: 8-15%, Mo: 5-10% (with W+2Mo: 24-30%), V: 4.5-8%, Co: 7-13%, and N: 0.02-0.1% and the remainder composed of Fe and inevitable impurities.

CITATION LIST

Patent Document

Patent Document 1: JP 2007-283432 A
Patent Document 2: JP H05-228729 A

SUMMARY OF THE INVENTION

Technical Problems

In the shaving method in Patent Document 1, with an object of suppressing damage to the blade edge of the die, the cooling liquid is jetted to the blade edge of the die from the plurality of jetting devices so as to cool the die during shaving and suppress heat generation. Thus, the shaving method in Patent Document 1 requires a forced cooling device which directly applies the cooling liquid to the blade edge of the die, and consequently a configuration of a device realizing this shaving method is complex, and operations of the shaving including cooling the die are complicated.

Moreover, an object of the shaving die in Patent Document 2 is to have abrasion resistance and toughness which are required in a shaving die for a relatively soft metal wire of copper, a copper alloy, or the like. In this shaving die, coating which is conventionally considered as essential is not necessarily required, and a rake angle to a wire is 40° to 50° and a clearance angle from the wire is 3° to 10°. Thereby, the shaving die is so designed that such a blade edge strength that crack and breakage due to a cutting force during shaving do not occur is ensured, and chip powders are smoothly discharged.

Thus, mainly in view of tool abrasion, Patent Document 2 discloses a shape of the blade edge of the shaving die for a relatively soft metal wire of copper, a copper alloy, or the like, which is not for a steel wire harder than copper and a copper alloy.

However, no matter which of the techniques disclosed in Patent Documents is employed, increasing a speed of the wire passing through the die to improve productivity causes cutting heat to increase so that chips generated by cutting are soft and elongated in a tape shape and thus made to be difficult to be cut off. The chips soft and difficult to be cut off are formed into continuously connected long chips that wind around the wire, and thus engage the die during shaving, which may damage the die. In addition to this, to discharge the chips winding around the wire, frequently stopping a shaving step is required, which causes productivity of the wire to decrease.

An object of the present invention is thus to provide a shaving tool which can forcedly cut off the chips generated by shaving of the wire.

Solution to Problems

To achieve the object as described above, the following technical elements are adopted according to the present invention.

A shaving tool according to the present invention is a shaving tool for cutting a surface layer of a wire, including: an annular cutting blade for cutting the surface layer of the wire as the wire is inserted thereinto; and a plurality of projections arranged around the cutting blade and at corresponding positions at which the plurality of projections come into contact with the surface layer of the wire that has been cut by the cutting blade.

Preferably, provided that a distance from a blade edge of the cutting blade to each of the projections is a projection distance, the plurality of projections may be arranged at corresponding positions at each of which the projection distance is 110% or less of a thickness of the surface layer of the wire that has been cut.

Preferably, provided that a distance from a blade edge of the cutting blade to each of the projections is a projection distance, the plurality of projections may be arranged at corresponding positions at each of which the projection distance is from 50 µm or more to 110 µm or less.

Preferably, the plurality of projections may be arranged at such corresponding positions that an angle about a center of the annular cutting blade in which one of the projections adjacent to each other and the other are viewed from the center is from 10° or more to 40° or less, and in such a manner as to be spaced from one another.

Preferably, the plurality of projections may be arranged at such corresponding positions that the projection distance is identical and in such a manner as to be spaced from one another at equal interval therebetween along a circumferential direction of the annular cutting blade.

Effects of the Invention

With the shaving tool according to the present invention, the chips generated by shaving of the wire can be forcedly cut off.

DESCRIPTION OF EMBODIMENTS

Hereinafter, embodiments of the present invention will be described with reference to the drawings. Note that the embodiments as described below are specific examples of the present invention, and configurations of the present invention are not limited only to specific examples thereof. Thus, the technical scope of the present invention is not limited only to the disclosure of the embodiments herein.

Before describing a shaving tool according to an embodiment of the present invention, a summary of shaving of a steel wire will be described with reference to FIG. 2A and FIG. 2B.

Figure 2A:
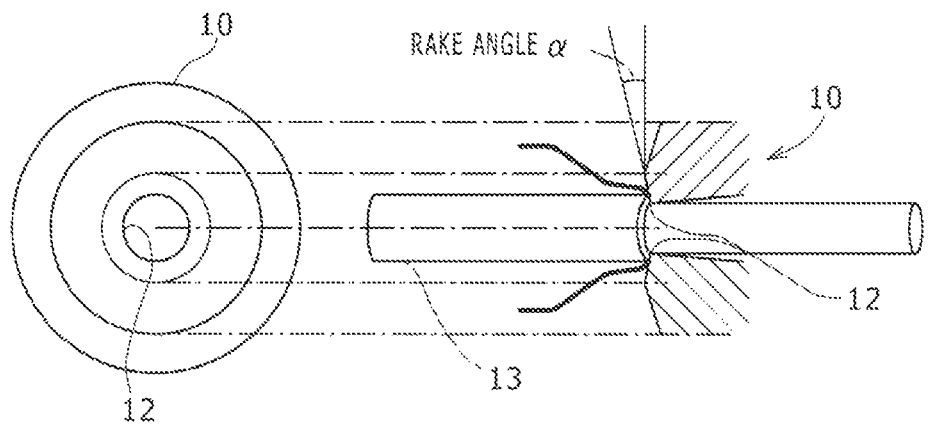
FIG. 2A is a diagram illustrating a configuration of a conventional shaving die, and an explanatory view schematically illustrating a front view and a cross-sectional view of the shaving die.

FIG. 2A is a diagram illustrating a configuration of a shaving die 10 which is a shaving tool conventionally used. In FIG. 2A, in the left side of the drawing paper, a front view (view from a direction in which a through hole appears to be through) of the cylindrical shaving die 10 from an axial direction is illustrated, while, in the right side, a cross-sectional view (cross sectional side view) of the shaving die 10 taken along a plane containing an axis is schematically illustrated. Moreover, in FIG. 2B, a front view of a state of the shaving die 10 and chips 11 during shaving from a side of a cutting blade 12 of the shaving die 10 is schematically illustrated.

A steel wire (hereinafter simply referred to as wire) 13 is a metal wire used for, for example, a suspension bridge wire cable, a spring, or the like, and made of stainless steel, copper, a copper alloy, or the like. Flaws, such as a scale and a roll mark, may remain on a surface of the wire immediately after a hot rolling step is completed. Such a surface layer of the wire 13 having flaws on the surface is cut and removed (peeled) over the entirety of a circumference to approximately tens to hundreds μm deep, for example, so that the surface irregularities of the wire 13 can be smoothened and quality of the surface of the wire 13 can be improved. Cutting (peeling) the surface layer of the wire 13 is also referred to as shaving, and in this shaving, the shaving die 10 which is a shaving tool is used.

Figure 2B:
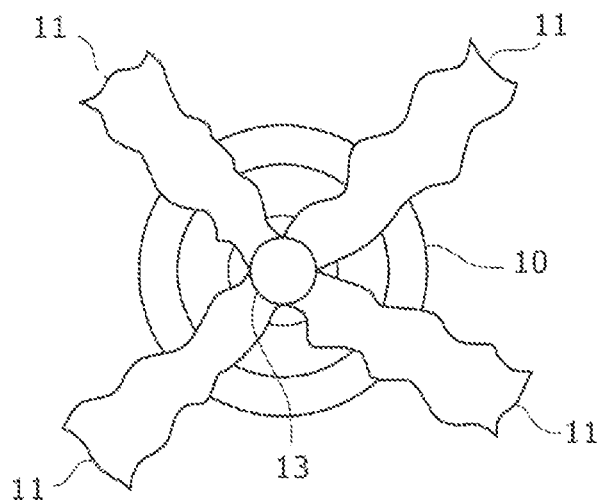
FIG. 2B is a diagram illustrating the configuration of the conventional shaving die, and an explanatory view illustrating a state of the shaving die during shaving.

The conventional shaving die 10 as illustrated in FIG. 2A and FIG. 2B is a die-shaped member, for example, having a cylindrical exterior shape and a height less than a diameter. The cylindrical shaving die 10 includes a through hole formed along an axis of the shaving die 10, and the through hole and the shaving die 10 are substantially concentric with each other. In this through hole, an annular cutting blade 12 is formed at a circumference portion of one opening.

As illustrated in FIG. 2A, a supply device (unillustrated) of the wire 13 supplies the wire 13 to the shaving die 10, and the supplied wire 13 is inserted, from the opening at which the cutting blade 12 is formed, into the through hole. Then, the wire 13 is wound by a winding device (unillustrated) of the wire 13 disposed at a side opposite to the supply device with the shaving die 10 interposed therebetween. A tractive force of winding by the winder allows the wire 13 to pass through the shaving die 10, and the annular cutting blade 12 cuts the surface layer thereof over the entirety of a circumference and removes surface flaws. In such a series of finishings of the wire 13 called shaving step, the surface layer of the wire 13 that has been cut through the shaving die 10 is formed into thin tape-shaped chips 11.

In FIG. 2B, a state of the tape-shaped chips 11 is illustrated, and as illustrated in FIG. 2B, in the conventional shaving die 10, the tape-shaped chips 11 are produced into an irregular shape. These tape-shaped chips 11 are required to be removed from the circumference of the wire 13 before winding around the wire 13, and thus are cut off and removed by a device for removing the chips 11, such as a rotating bar which orbits or rotate around the shaving die 10.

However, increasing a speed (drawing speed) of the wire 13 passing through the shaving die 10 causes cutting heat due to friction between the wire 13 and the cutting blade 12 to increase, which thus increases the temperature of the chips 11 produced by cutting. The chips 11 having an increased temperature are soft and elongated in a tape shape and thus are easily deformed and made to be difficult to be cut off. The chips 11 soft and difficult to be cut off are formed into continuously connected long chips 11 that wind around the wire 13, and thus engage the cutting blade 12 of the shaving die during shaving, which may damage the shaving die. In addition to this, to discharge the chips 11 winding around the wire 13, frequently stopping the shaving step is required, which causes productivity of the wire 13 to decrease.

If a shaving die 1 according to this embodiment as described below is used in place of such conventional shaving die 10, chips are easily cut off even when a drawing speed is increased so that winding of the chips around the wire 13 can be suppressed.

The shaving die 1 according to this embodiment will be described with reference to FIG. 1A and FIG. 1B.

Figure 1A:
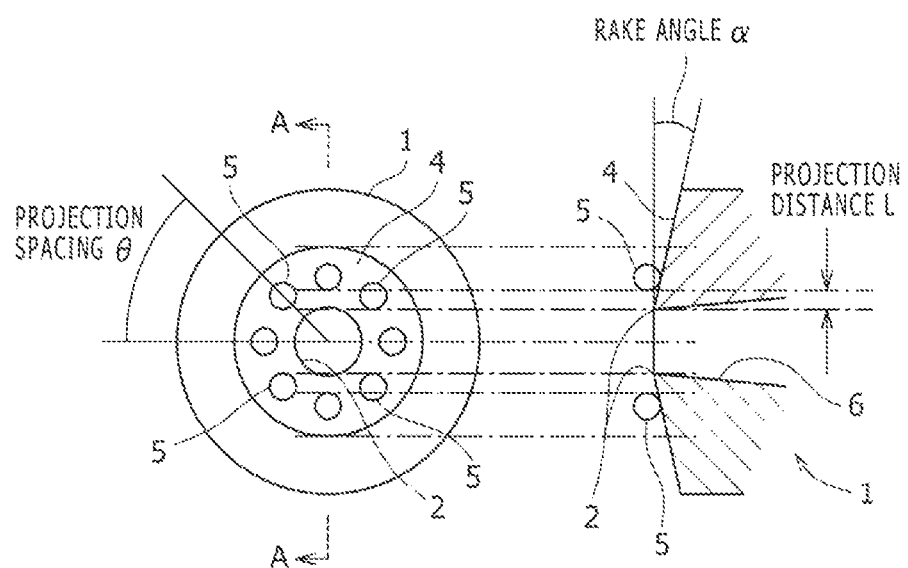
FIG. 1A is a diagram illustrating a configuration of a shaving die according to an embodiment of the present invention, and an explanatory view schematically illustrating a front view and a cross-sectional view of the shaving die.
Figure 1B:
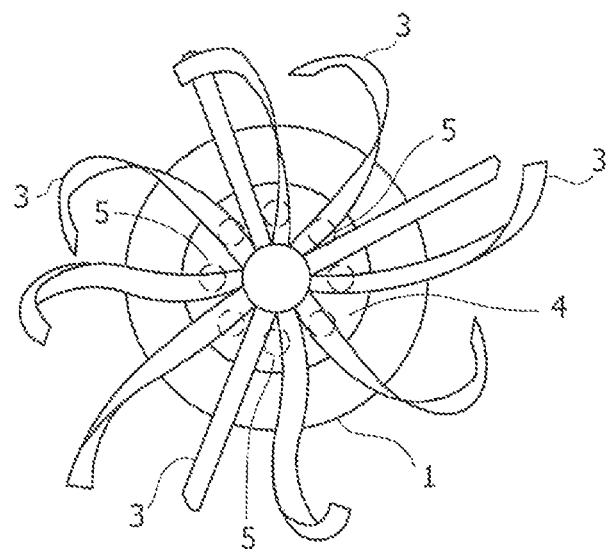
FIG. 1B is a diagram illustrating the configuration of the shaving die according to the embodiment of the present invention, and an explanatory view illustrating a state of the shaving die during shaving.

FIG. 1A and FIG. 1B are each a diagram illustrating a configuration of the shaving die 1 which is a shaving tool according to this embodiment. In FIG. 1A, in the left side of the drawing paper, a front view (view from a direction in which a through hole appears to be through) of the cylindrical shaving die 1 from an axial direction is illustrated, while, in the right side, a cross-sectional view (cross sectional side view) of the shaving die 1, as illustrated on the upper side of the drawing paper, taken along the line A-A is schematically illustrated. Moreover, in FIG. 1B, a front view of a state of the shaving die 1 and chips 3 during shaving from a side of a cutting blade 2 of the shaving die 1 is schematically illustrated.

The shaving die 1 as illustrated in FIG. 1A is a die-shaped member, for example, having a cylindrical exterior shape and a height less than a diameter, and, for example, made of a hard alloy, high-speed tool steel, or ceramics. This cylindrical shaving die 1 includes a through hole 6 formed to be substantially concentric with the shaving die 1 along an axis of the shaving die 1. Moreover, the shaving die 1 includes an annular cutting blade 2 formed over the entirety of a circumference portion of one opening of the through hole 6, a rake surface 4 formed around the cutting blade 2, and a plurality of projections 5 formed on the rake surface 4.

In the front view of FIG. 1A, the shaving die 1 as illustrated by a circle includes the through hole 6 in the vicinity of the center of the circle. As illustrated in the cross-sectional view of FIG. 1A, the through hole 6 forms a space having a so-called truncated-cone shape in which an inner diameter gradually enlarges from a front side of the shaving die 1 toward a rear side which is an opposite surface. Thus, with respect to two openings of the through hole 6 which have diameters different from each other, the one opening having a small diameter is formed at the front side of the shaving die 1 and the other opening having a large diameter is formed at a back side of the shaving die.

The cutting blade 2 is formed at the circumference portion of the small-diameter opening of the through hole 6 over the entirety of the circumference. Thus, the cutting blade 2 is formed into an annular shape so that a surface layer of a wire can be cut over the entirety of a circumference at the same time while the wire is inserted from the front side of the shaving die 1 into the through hole 6. Here, the wire cut by the cutting blade 2 passes through the through hole 6 and moves toward the back side of the shaving die 1, while the through hole 6 is formed into a truncated-cone shape, so that the wire in the through hole 6 does not become parallel to a wall surface of the through hole 6. This wall surface of the through hole 6 is also referred to as clearance surface. The more the wire moves toward the back side of the shaving die, the greater a distance between the wire and the clearance surface becomes. In this case, an angle formed by the wire and the clearance surface is referred to as clearance angle, and this clearance angle is necessary so as to avoid a second contact in which the wire comes into contact with the wall surface of the through hole 6.

As illustrated in FIG. 1A, the rake surface 4 is formed around the annular cutting blade 2 in a concentric manner, and is an annular surface determining a rake angle of the cutting blade 2. Here, the rake angle is an angle of the rake surface 4 relative to a plane orthogonal to a surface of the wire cut by the cutting blade 2, and the magnitude of the rake angle is determined in consideration of properties or performances to be performed by the shaving die 1, such as cutting resistance and thickness of chips.

Here, the rake surface 4 may be also considered to form the cutting blade 2 at a part intersecting with the clearance surface of the through hole 6. In this case, an angle formed by the rake surface 4 and the clearance surface of the through hole 6, i.e., an angle of the cutting blade 2 in the cross-sectional view as illustrated in FIG. 1A may be acute or obtuse.

Note that the area of the rake surface 4 is arbitrary, but in this embodiment, at least an area necessary to form the projections 5 as described below is required.

The plurality of projections 5 are arranged on the rake surface 4 in such a manner as to surround the annular cutting blade 2, and projects upward of the rake surface 4. The plurality of projections 5 each have substantially identical shape and size.

Since the shaving die 1 according to this embodiment is characterized by the plurality of the projections 5 formed on this rake surface 4, an arrangement and a configuration of the plurality of projections 5 will be described in detail hereinafter.

The plurality of projections 5 each have substantially identical shape and size, such as a cylindrical, prismatic, or spherical shape, and each are a member which projects in a convex manner when arranged on the rake surface 4. These projections 5 are plurally arranged at corresponding appropriate positions on the rake surface 4 so that the chips 3 that have been cut by the cutting blade 2 come into contact with or collide with the projections 5.

As illustrated in FIG. 1B, the chips 3 suffer deformation, such as forced curling (winding), or arc curving in a width direction of the chips 3, due to this contact or collision. When forcedly curled, the chips 3 are easily cut off in an automatic manner. Moreover, when curved, the chips 3 improve in rigidity so as to be easily cut off by a rotating bar provided around the shaving die 1 and easily finely cut off into a strip shape.

To easily cut off the chips 3 in this manner, the plurality of projections 5 are to be arranged at corresponding appropriate positions on the rake surface 4. Thus, in this embodiment, the arrangement of the plurality of projections 5 is determined by using two parameters which are a projection distance L and a projection spacing θ.

As illustrated in the cross-sectional view of FIG. 1A, the projection distance L is a distance from a blade edge of the cutting blade 2 to each of the projections 5. Since, as the projection distance L varies according as positions at which the projections 5 are arranged vary, a state of contact or collision of the chips 3 with the projections 5 varies, the projection distance L suitable for cutting off the chips 3 is determined as a ratio relative to a thickness of the surface layer that has been cut (substantially identical to a thickness of the chips 3).

If the projection distance L is less than 50% of the thickness of the surface layer to be cut, a distance between a tip end of the cutting blade 2 and the projections 5 is too short, so that sections of the chips 3 in a thickness direction immediately after cutting interfere with the projections 5. If the distance between the tip end of the cutting blade 2 and the projections 5 is too short, effects of the projections 5, such as curling or curving of the chips 3, can be no longer obtained.

Moreover, if the projection distance L is equal to or more than 120% of the thickness of the surface layer to be cut, the distance between the tip end of the cutting blade 2 and the projections 5 is too long, so that the chips 3 that have been cut curve before coming into contact with the projections 5, and move away from the shaving die 1. If the distance between the tip end of the cutting blade 2 and the projections 5 is too long, the chips 3 fail to come into contact with the projections 5 and the effects of the projections 5 can be no longer obtained.

As illustrated in the front view of FIG. 1A, the projection spacing θ is an angle about the center of the annular cutting blade 2 in which one of the projections 5 adjacent to each other among the plurality of projections 5 arranged on the rake surface 4 in such a manner as to surround the cutting blade 2 and the other are viewed from the center. Specifically, the angle formed by a line connecting the one projection 5 with the center of the cutting blade 2 and a line connecting the other projection 5 with the center of the cutting blade 2 is the projection spacing θ.

If the projection spacing θ is equal to or more than 60°, the number of the projections 5 which can be arranged is too small, so that the chips 3 which fail to come into contact with the projections 5 are produced and obtaining the effects of the projections 5 as described above becomes difficult. Moreover, if the projection spacing θ is less than 10°, the number of the projections 5 is too large, so that the rake surface 4 is nearly in a flat and smooth state in which no gap between the one projection 5 and the other projection 5 which the chips 3 enter is present and thus obtaining the effects of the projections 5 becomes difficult.

If the plurality of projections 5 are arranged on the rake surface 4 in accordance with the projection distance L and the projection spacing θ as determined from the view point as described above, the chips 3 can be finely cut off. Thereby, no longer the chips 3 wind around the wire nor engage the cutting blade 2, and thus crack of the cutting blade 2 can be suppressed. In addition, the chips 3 that have been finely cut off can be easily removed by suction or extraction so that stopping the shaving step to remove the chips 3 is no longer required, and productivity can be improved as well.

EXAMPLES

Hereinafter, results in which a wire is cut by using the conventional shaving die (without projections) failing to include the projections 5 as described in the above embodiment and results in which cutting is performed by using the shaving die (with projections) including the projections 5 will be described as examples. Below Table 1 is a summary of the results in cases "without projections" and the results in cases "with projections."

TABLE 1

| Without projections | Drawing speed 80: chips cut off, winding not occurred, processable |  |  |  |  |  |
|---|---|---|---|---|---|---|
|  | Drawing speed 120: chips not cut off, winding occurred, unprocessable |  |  |  |  |  |
| With projections | Drawing | Projection distance L (μm) | | | | |
|  | speed 120 | 60 | 80 | 100 | 120 | 140 |
| Projection spacing θ (°) | 90° | x | x | x | x | x |
|  | 45° | x | x | x | x | x |
|  | 30° | ○ | ○ | ○ | x | x |
|  | 20° | ○ | ○ | ○ | x | x |
|  | 15° | ○ | ○ | ○ | x | x |

First, as a material for an object to be cut, a wire having a diameter of 4 mm, and a surface hardness of 140 HV in Vickers hardness defined according to JIS Z 2244: 2009, and made of high carbon chromium bearing steel SUJ2 steel defined according to JIS G 4805: 2008 was prepared. The superhard shaving dies of a plurality of types which cut a surface layer of this wire to 100 μm deep were prepared. The shaving dies of the plurality of types consisted of the shaving die of one type "without projections" in which the projections 5 were not formed, and the shaving dies of the other types "with projections" in which combinations of the projection distance L and the projection spacing θ of the plurality of projections 5 variously differed from each other.

A drawing speed which is a speed of the wire made to pass through the shaving die was 80 m/min and 120 m/min in the shaving die "without projections" and 120 m/min in the shaving dies "with projections." Consequently, as indicated in Table 1, in the shaving die "without projections," chips were cut off and winding around the wire did not occur at the drawing speed of 80 m/min.

On the other hand, in the shaving die "without projections," when the drawing speed is increased to 120 m/min, the chips were not cut off and winding around the wire occurred. When the shaving die fails to include the projections, shaving processing to the wire at the drawing speed of 120 m/min was impossible.

Then, with respect to the shaving dies "with projections," the wire was subjected to the shaving processing at the drawing speed of 120 m/min. The results are shown in Table 1. In Table 1, the results with respect to the shaving dies "with projections" are shown in terms of the combinations of the projection distance L and the projection spacing θ. The result of each combination is indicated by a symbol "○" or a symbol "x," in which the symbol "○" indicates that the chips were cut off and the shaving processing was favorable. The symbol "x" indicates that the chips were not cut off and the shaving processing was unfavorable.

Considering the combinations provided with the symbol "○" in Table 1, it has been found out that the shaving processing was favorably performed with the projection distance L in the range from 60 μm to 100 μm. When the projection distance L is 120 μm which is greater than 100 μm, the shaving processing was unfavorable and the symbols "x" are provided. However, the projection distance L above 100 μm does not necessarily cause the shaving processing to be unfavorable immediately. On the basis of this, the present inventor has already confirmed that an upper limit of the projection distance L can be raised up to 110 μm as long as the appropriate projection spacing θ is maintained.

On the other hand, the projection distance L below 60 μm does not necessarily cause the shaving processing to be unfavorable immediately. As described above, if the projection distance L is less than 50% of the thickness of the surface layer to be cut, the distance between a tip end of the cutting blade and the projections 5 is too short, which causes the shaving processing to be unfavorable. Thus, although the projection distance L below 50 μm (less than 50 μm) which is 50% of the thickness of the surface layer to be cut causes the shaving processing to be unfavorable, the present inventor has already confirmed that a lower limit of the projection distance L can be reduced down to 50 μm as long as the appropriate projection spacing θ is maintained.

To summarize the above results, it can be considered that, when the plurality of projections 5 are arranged on the rake surface at corresponding positions at each of which the projection distance L is from 50 μm or more to 110 μm or less, the shaving processing can be favorably performed even at the high drawing speed, such as 120 m/min. The results herein in which, when the thickness of the surface layer to be cut is 100 μm, the projection distance L may be 110 μm or less can be generalized as follows. That is, the plurality of projections 5 may be arranged at corresponding positions at each of which the projection distance L is 110% or less of the thickness of the surface layer of the wire that has been cut.

Next, considering the combinations provided with the symbol "○" in Table 1, it has been found out that the shaving processing was favorably performed with the projection spacing θ in the range from 15° to 30°. When the projection spacing θ is 45° which is greater than 30°, the shaving processing was unfavorable and the symbols "x" are provided. However, the projection spacing θ above 30° does not necessarily cause the shaving processing to be unfavorable immediately. On the basis of this, the present inventor has already confirmed that an upper limit of the projection spacing θ can be raised up to 40° as long as the appropriate projection distance L is maintained.

On the other hand, the projection spacing θ below 15° does not necessarily cause the shaving processing to be unfavorable immediately. However, as described above, if the projection spacing θ is less than 10°, the rake surface is nearly in a flat and smooth state in which no gap between the one projection 5 and the other projection 5 which the chips 3 enter is present, which causes the shaving processing to be unfavorable. Thus, the present inventor has already confirmed that a lower limit of the projection spacing θ can be reduced down to 10° as long as the appropriate projection distance L is maintained.

To summarize the above results, it can be considered that, when the plurality of projections 5 are arranged on the rake surface at corresponding positions at each of which the projection spacing θ is from 10° or more to 40° or less, the shaving processing can be favorably performed even at the high drawing speed, such as 120 m/min.

As described above, when the projection distance L is selected in the range from 50 µm or more to 110 µm or less and the projection spacing θ is selected in the range from 10° or more to 40° or less so as to arrange the plurality of projections 5, these plurality of projections 5 are arranged at such corresponding positions that the projection distance L is identical and in such a manner as to be spaced from one another at equal interval therebetween along a circumferential direction of the annular cutting blade.

In the shaving die including the projections 5 arranged in this manner, even when the temperature of the chips increases due to cutting heat increased in accordance with a high drawing speed so that the chips are soft and difficult to be cut off, winding of the continuously connected chips around the wire can be suppressed and the chips can be easily cut off. Thereby, also in the shaving at a high drawing speed, breakage of the shaving die due to engagement of the chips with the cutting blade and stop of the shaving process for discharging the chips winding around the wire can be avoided so that high productivity at a high drawing speed can be achieved.

The embodiments disclosed herein should be considered illustrative, not restrictive, in all respects. In particular, for matters not specifically disclosed in the embodiments herein, such as operating conditions, measuring conditions, various parameters, and dimensions, weights, and volumes of components, values that do not depart from the scope typically implemented by those skilled in the art and that can be easily supposed by those skilled in the art are adopted.

The present application is based on Japanese Patent Application (No. 2013-098473) filed on May 8, 2013, and the contents thereof are incorporated herein by reference.

EXPLANATION OF REFERENCE NUMERALS 1 shaving die
2 cutting blade
3 chips
4 rake surface
5 projection
6 through hole

The invention claimed is:

1. A shaving tool for cutting a surface layer of a wire, comprising:
    an annular cutting blade having a blade edge at a leading end thereof for cutting the surface layer of the wire as the wire is inserted thereinto;
    a rake surface being an annular surface formed around the annular cutting blade, said rake surface inclining with respect to a plane orthogonal to a surface of the wire cut by the cutting blade towards the insertion direction of the wire; and
    a plurality of projections provided on the rake surface such that the plurality of projections are arranged around the cutting blade and at corresponding positions at which the plurality of projections come into contact with the surface layer of the wire that has been cut by the cutting blade,
    the plurality of projections are arranged at corresponding positions at each of which a projection distance is from 50 µm or more to 110 µm or less where the projection distance is defined as a distance from a blade edge of the cutting blade to each of the projections,
    wherein the plurality of projections are arranged at corresponding positions that an angle about a center of the annular cutting blade in which one of the projections adjacent to each other and the other are viewed from the center is from 10° or more to 40° or less, and in such a manner as to be spaced from one another and
    wherein the plurality of projections each project further from the blade edge at the leading end of the annular cutting blade.

2. The shaving tool according to claim 1, wherein the plurality of projections are arranged at corresponding positions that the projection distance is identical and in such a manner as to be spaced from one another at equal interval therebetween along a circumferential direction of the annular cutting blade.

3. The shaving tool according to claim 1, wherein each of the plurality of projections has a cylindrical shape.

4. The shaving tool according to claim 1, wherein each of the plurality of projections has a prismatic shape.

5. The shaving tool according to claim 1, wherein each of the plurality of projections has a spherical shape.

* * * * *